F. M. JONES.
BICYCLE CRANK HANGER.
APPLICATION FILED MAY 23, 1917.
1,235,530.
Patented July 31, 1917.
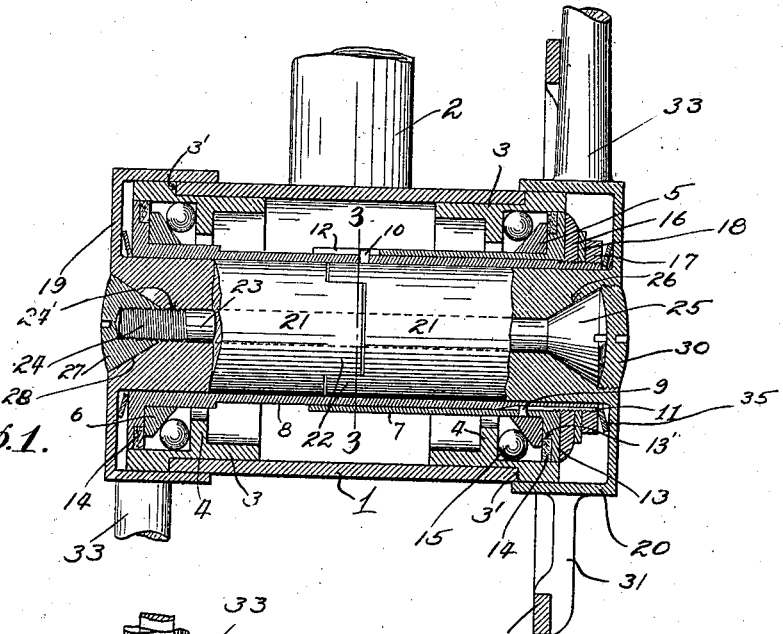
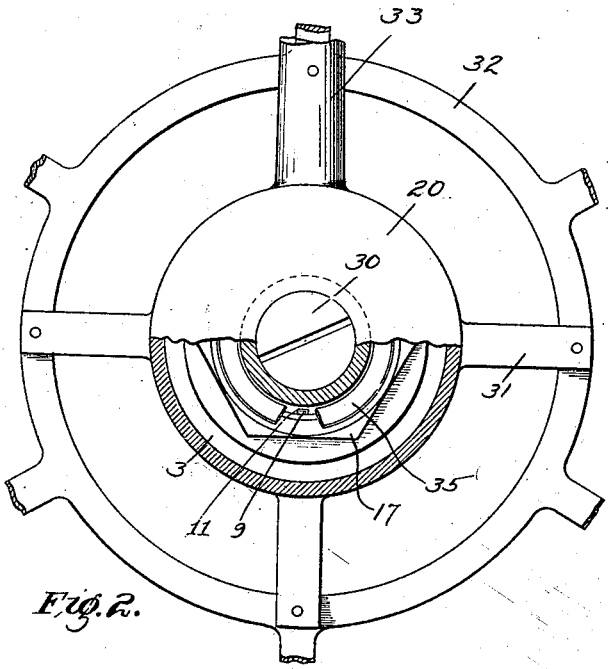
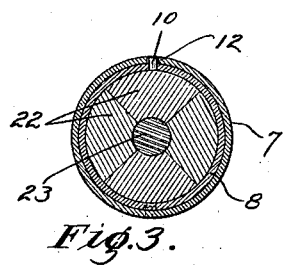
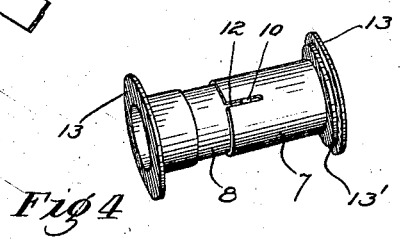
INVENTOR.
Francis M. Jones
BY H. A. Stock
ATTORNEY

UNITED STATES PATENT OFFICE.

FRANCIS M. JONES, OF OAKLAND, CALIFORNIA.

BICYCLE-CRANK HANGER.

1,235,530.  Specification of Letters Patent.  Patented July 31, 1917.

Application filed May 23, 1917. Serial No. 170,768.

*To all whom it may concern:*

Be it known that I, FRANCIS M. JONES, a citizen of the United States, residing at Oakland, in the county of Alameda and State of California, have invented certain new and useful Improvements in Bicycle-Crank Hangers, of which the following is a specification.

This invention relates to improvements in the driving mechanism of bicycles and more particularly in the crank shaft and the crank shaft bearing.

The principal object of the present invention is to secure perfect alinement of the two sets of ball bearings. In prior bearings for this purpose, as made commercially, it has been impossible to get exact alinement of the two ball races which is essential to secure easy and free running qualities, and to eliminate the wedging action of the bearings due to their imperfect alinement.

Another object of my present invention is to provide a bearing wherein the cones and cups which constitute the ball races are made adjustable without the use of screwthreads.

A still further object of the present invention is to provide means for holding the cones on the two sides of the bearing in fixed relation to each other, and still further objects are to provide means for excluding the dust, to hold the crank hanger against the members which support the ball cones, and to so arrange the various parts that the same may be easily adjusted and quickly assembled.

With these and other objects in view, the invention consists of certain novel features of construction, combinations and arrangements of parts hereinafter described and more specifically pointed out in the appended claims; it being understood that changes in form, proportion, size and minor details of construction within the scope of the claims may be resorted to without departing from the spirit of the invention or sacrificing any of the advantages thereof.

Referring to the drawings forming a part of this specification,

Figure 1, is a sectional view of a crank-hanger constructed in accordance with my invention.

Fig. 2, is a view partly in elevation and partly in section of the sprocket end of this crank hanger.

Fig. 3, is a view in section on 3—3, Fig. 1.

Fig. 4, is a view in perspective of the telescopic sleeve members showing how they are held in fixed circumferential relation to each other.

Denoting corresponding parts of the several views by the same numerals of reference, 1 denotes the cylindrical frame bracket in which the bearing is mounted and to which are attached the tubular frame members one of which is shown at 2.

In each end of the bracket 1 are ball cups denoted by 3 and which are pressed tightly therein. These cups are shouldered as at 3' so that the end which projects from the bracket 1 has the same outside diameter as this bracket. Each of the cups is provided on the inside with an annular rib 4 forming one part of a ball race which provides a two point contact for the balls. Coöperating with these cups are the cones 5 and 6 which are frictionally held on the sleeves 7 and 8. Sleeve 7 is the larger in diameter and telescopes over sleeve 8.

These two sleeves may move axially with respect to each other but are prevented from moving circumferentially by means of pins 9 and 10, the former extending inwardly from the inside surface of sleeve 7 and coöperating with a groove 11 on the outer surface of sleeve 8, while the pin 10 extends outwardly from sleeve 8 and coöperates with a slot 12 in the inner end of sleeve 7.

On the outer end of each of these sleeves is integrally formed a disk 13 on the inside of which is a shoulder 13'. The diameter of this shoulder is smaller than the outer diameter of the ball cones, hence there is formed an annular recess in which is seated a felt washer 14, the outer face of which bears against the inner surface of the cups 3, thereby effectively retaining the oil and excluding dust.

The faces of cones 5 and 6 are inclined at an acute angle to the bearing faces of cups 3, thus forming a single point contact for the balls 15. The outer faces of disks 13 are substantially in alinement with the outer ends of the cups 3 and the opposite end of sleeve 8 extends through the disk end of sleeve 7 and is there screw-threaded to receive the nut 16, by which the adjustment of the cones with respect to their coöperating cups, is effected.

A lock nut 17 is also in engagement with the outer end of these threads and a washer 18 is interposed between the lock nut and the adjusting nut.

The crank hanger is made in two parts comprising caps 19 and 20 which are adapted to fit over the projecting ends of cups 3 and slightly over the ends of member 1, thereby assisting in excluding dust. The cranks 33 are attached to the circumferential face of these caps, whereby they overhang the ball races. Cap 20 is provided with arms 31 to which is attached the sprocket wheel 32.

Each of these caps is provided with the inwardly extending axle 21 which is provided with clutch teeth 22 adapted to coöperate with similar clutch teeth formed on the axle of the opposite crank. These teeth may be slightly tapered so that any variation in cutting may be compensated for by drawing the parts more closely together.

To hold these two parts of the hanger together I provide a bolt 23 which extends through alining openings in the axle and is provided with a conical head 25 that is adapted to seat in a similar shaped recess 26 formed in the axle of cap 20. The opposite end of this bolt is screw-threaded at 24 and engages threads 24' formed on the axle of cap 19. This axle is provided with a conical recess 28 in which is seated a similar shaped nut 27 that engages the ends of screw threads 24.

To lock this bolt in position, I provide a screw 30 which is in threaded engagement with the outer portion of recess 26 and which has its inner face positioned against the head of bolt 24 thereby preventing the latter from turning.

To cause the sleeves 7 and 8 to turn with the crank hangers, I interpose the annular cone washers 35 between the outer ends of the sleeves 7 and 8 and the inner surface of the caps 19 and 20. This not only holds the sleeves with respect to the crank shaft but also takes care of any variation in the distance between the faces of the caps due to the fit of the clutch teeth 22 on each other.

Adjustment of the ball races is secured by the use of the single nut 16, while the two parts of the hanger are effectively held together by the bolt 23 with its conical head and nut. Accurate alinement is secured between the ball cones due to the fact that there are no threaded surfaces and the cones can be ground after tempering, and forced tightly on their respective sleeves. These sleeves in turn are held in alinement due to the long length of one which telescopes in the other.

Thus as a whole, I have a bicycle crank-hanger which effectively accomplishes the objects set forth at the beginning of this specification.

I claim as new and wish to cover by Letters Patent:—

1. A bicycle crank hanger comprising a hanger bracket, a ball cup secured in each end of said bracket, a two-piece crank shaft extending through said bracket, a sleeve closely fitting over said shaft, a second sleeve closely fitting over said first mentioned sleeve, means to prevent rotation of said sleeves relative to each other, ball cones on said sleeves adapted to coöperate with said ball cups, and means for adjustably holding said sleeves in relative axial relation to each other.

2. A bicycle crank hanger comprising a hanger bracket, ball cups secured in the ends of said bracket, a two-piece crank shaft extending through said bracket, recessed caps on the outer end of said crank shaft adapted to inclose the end of said bracket, an inner sleeve adapted to fit closely about said shaft, an outer sleeve telescopically arranged about said inner sleeve, a ball cone seated on the outer end of said inner and said outer sleeve and adapted to form ball races with said cups, a nut in threaded engagement with said inner sleeve to adjust said ball races, and means for holding the two parts of the hanger together.

3. A bicycle crank hanger comprising a two-part crank shaft, means for holding said parts in fixed relation to each other, a sleeve fitting over said shaft and extending substantially the length thereof, an outer sleeve fitting over said first mentioned sleeve, a pin extending from one of said sleeves and engaging a slot in the other of said sleeves, and means for holding said outer sleeve in adjusted relation to said first mentioned sleeve.

4. A bicycle crank hanger comprising a two-part crank shaft, means for holding said parts in fixed relation to each other, a sleeve fitting over said shaft and extending substantially the length thereof, an outer sleeve fitting over said first mentioned sleeve, a pin extending from one of said sleeves and engaging a slot in the other of said sleeves, a disk integrally formed on the outer end of each of said sleeves, ball cones seated in the angles between said sleeves and said disks, a hanger bracket, cups in the ends of said bracket adapted to coöperate with said cones to form ball races, and means for holding said cones in adjusted relation with said cups.

5. A bicycle crank hanger comprising a hanger bracket, ball cups secured in the ends of said hanger and having their outer surface flush with the outer surface of said bracket, a radial annular rib formed on the inner surface of each of said cups, a two-part crank shaft extending through said bracket, recessed caps on the outer end of said shaft adapted to inclose the ends of said caps and said bracket, a bolt adapted to secure the parts of said crank shaft together, a sleeve fitting closely about said crank shaft, conical annular washers between the inner faces of said caps and the end of said sleeve, an outer sleeve held in fixed circumferential relation to said first mentioned sleeve, means for adjusting the axial position of said outer sleeve on said first mentioned sleeve, and ball cones on the outer end of said sleeve adapted to coöperate with said annular ribs to form ball races.

6. A bicycle bearing comprising a shaft, a sleeve fitting over said shaft, an outer sleeve slidably mounted on said first mentioned sleeve, means for holding said sleeves in fixed circumferential relation to each other, means for adjustably holding said sleeves in relative axial relation to each other, ball cones on the outer ends of said sleeves and ball cups adapted to coöperate with said cones to form ball races.

7. A bicycle bearing comprising a shaft, a sleeve fitting over said shaft, an outer sleeve longitudinally movable on said first mentioned sleeve, ball cones on the outer ends of said sleeves, ball cups adapted to coöperate with said ball cones to form ball races, and means for holding said sleeves in adjusted axial relation to each other.

In testimony whereof I affix my signature.

FRANCIS M. JONES.

Copies of this patent may be obtained for five cents each, by addressing the "Commissioner of Patents, Washington, D. C."